United States Patent
Chen et al.

(10) Patent No.: US 12,093,639 B2
(45) Date of Patent: Sep. 17, 2024

(54) FAST CREATION OF A SECOND DOCUMENT ASSOCIATED WITH A FIRST DOCUMENT

(71) Applicant: BEIJING ZITIAO NETWORK TECHNOLOGY CO., LTD., Beijing (CN)

(72) Inventors: Wei Chen, Beijing (CN); Qing Zeng, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/239,710

(22) Filed: Aug. 29, 2023

(65) Prior Publication Data

US 2023/0409809 A1 Dec. 21, 2023

Related U.S. Application Data

(63) Continuation of application No. PCT/CN2022/078667, filed on Mar. 1, 2022.

(30) Foreign Application Priority Data

Mar. 1, 2021 (CN) .......................... 202110226953.X

(51) Int. Cl.
*G06F 40/00* (2020.01)
*G06F 3/16* (2006.01)
(Continued)

(52) U.S. Cl.
CPC ............ *G06F 40/166* (2020.01); *G06F 3/167* (2013.01); *G06F 40/106* (2020.01)

(58) Field of Classification Search
CPC ...... G06F 40/166; G06F 40/106; G06F 3/167; G06F 4/166; G06F 4/106
See application file for complete search history.

(56) References Cited

U.S. PATENT DOCUMENTS 8,825,697 B2 * 9/2014 Foresti ................ G06F 16/2455
707/769
11,334,241 B2 * 5/2022 Sahgal .................... G06F 21/64
(Continued)

FOREIGN PATENT DOCUMENTS

CN 103207892 A 7/2013
CN 108885616 A 11/2018
(Continued)

OTHER PUBLICATIONS

International Patent Application No. PCT/CN2022/078667; Int'l Search Report; dated May 5, 2022; 3 pages.
(Continued)

*Primary Examiner* — Barbara M Level
(74) *Attorney, Agent, or Firm* — BakerHostetler

(57) ABSTRACT

Provided in the present disclosure are an electronic document processing method and apparatus, a terminal, and a storage medium. The electronic document processing method comprises: in a current display interface, in response to a document content determination operation, determining target content from the document content of a first document (S11); and, in the current display interface, in response to a document creation operation, creating a second document having an association relationship with the first document (S12), wherein the second document is associated with the first document on the basis of the target content. The method provided in the embodiments of the present disclosure can rapidly generate a second document having an association relationship with the content in a first document, so that there is no need for the user to repeatedly perform copy and paste and association operations, thereby greatly improving the usage experience of the user.

14 Claims, 5 Drawing Sheets

(51) Int. Cl.
*G06F 40/106* (2020.01)
*G06F 40/166* (2020.01)

(56) References Cited

U.S. PATENT DOCUMENTS

| | | | | |
|---|---|---|---|---|
| 2004/0015539 | A1* | 1/2004 | Alegria | G06F 40/166 709/203 |
| 2010/0058176 | A1* | 3/2010 | Carro | G06F 40/166 715/256 |
| 2011/0161792 | A1 | 6/2011 | Florence et al. | |
| 2012/0290926 | A1* | 11/2012 | Kapadia | G06F 40/166 715/255 |
| 2013/0246901 | A1* | 9/2013 | Massand | G06F 40/197 715/229 |
| 2014/0013204 | A1* | 1/2014 | Theis | G06F 16/84 715/255 |
| 2014/0089308 | A1* | 3/2014 | Ramakrishnan | G06F 16/93 707/736 |
| 2014/0237396 | A1* | 8/2014 | Blain | G06F 3/0482 715/760 |
| 2015/0046801 | A1 | 2/2015 | Liu et al. | |
| 2015/0347365 | A1* | 12/2015 | Li | G06F 21/6209 715/255 |
| 2016/0328368 | A1* | 11/2016 | Hyams | G06F 16/1767 |
| 2017/0003830 | A1 | 1/2017 | Kessler et al. | |
| 2017/0353466 | A1* | 12/2017 | Weaver | H04L 63/101 |
| 2018/0189246 | A1* | 7/2018 | Tene | G06F 40/174 |
| 2018/0189256 | A1* | 7/2018 | Gonzalez | G06F 40/134 |
| 2019/0179916 | A1* | 6/2019 | Sivaji | G06F 16/34 |
| 2023/0205904 | A1* | 6/2023 | Hassan | G06F 16/176 726/26 |

FOREIGN PATENT DOCUMENTS

| | | | |
|---|---|---|---|
| CN | 109446503 | A | 3/2019 |
| CN | 111078655 | A | 4/2020 |
| CN | 111310421 | A | 6/2020 |
| CN | 111339557 | A | 6/2020 |
| CN | 111817946 | A | 10/2020 |
| CN | 111949184 | A * | 11/2020 |
| CN | 112000257 | A | 11/2020 |
| CN | 112241865 | A | 1/2021 |
| CN | 112307716 | A | 2/2021 |

OTHER PUBLICATIONS

"Let the browser automatically detect blog and scan related articles"; Online World Network Skill; China Academic Journal; Jun. 2007; p. 93 (contains English Translation).

"How Word can reference Excel data and keep it updated synchronously"; https://jingyan.baidu.com/article/fcb5aff7880d4eedaa4a71a3.html; Baidu; Jul. 2014; accessed Mar. 1, 2024; 4 pages (contains English Translation).

European Patent Application No. 22762529.0; Extended Search Report; dated Jun. 5, 2024; 9 pages.

* cited by examiner

FAST CREATION OF A SECOND DOCUMENT ASSOCIATED WITH A FIRST DOCUMENT

CROSS REFERENCE

The disclosure is a continuation of PCT application Ser. No. PCT/CN2022/078667, titled "ELECTRONIC DOCUMENT PROCESSING METHOD AND APPARATUS, TERMINAL, AND STORAGE MEDIUM", filed on Mar. 1, 2022, claims priority to Chinese Patent Application No. 202110226953.X, field on Mar. 1, 2021, titled "ELECTRONIC DOCUMENT PROCESSING METHOD AND APPARATUS, TERMINAL, AND STORAGE MEDIUM", the entire contents of both of which are incorporated herein by reference.

TECHNICAL FIELD

The present disclosure relates to the field of computer technology, in particular to an electronic document processing method and apparatus, a terminal, and a storage medium.

BACKGROUND

With the development of computer technology, electronic documents are widely used. Electronic documents are usually stored in servers or local clients, and authorized users can access and edit the electronic documents.

SUMMARY

Embodiments of the disclosure provide an electronic document processing method and apparatus, a terminal, and a storage medium.

The following technical solutions are used in this disclosure. In some embodiments, the present disclosure provides an electronic document processing method, comprising: determining, in a current display interface, target content from document content of a first document in response to a document content determination operation; and creating, in response to a document creation operation in the current display interface, a second document associated with the first document, wherein the second document is associated with the first document based on the target content.

In some embodiments, the present disclosure provides an electronic document processing method, comprising: determining, in response to receiving a first document, permission information of a current user about a second document embedded in the first document; and displaying relevant information of the second document and a permission application identifier in a preset style if the current user has no preset permission for the second document.

In some embodiments, the present disclosure provides an electronic document processing method, comprising: selecting, in a current display interface, target document content from document content of a first document in response to a selection operation, the target document content being some document content of the first document; and determining a target sharing object in response to a sharing operation and sharing the target document content to the target sharing object.

In some embodiments, the present disclosure provides an electronic document processing apparatus, comprising: a determination unit, configured to determine, in a current display interface, target content from document content of a first document in response to a document content determination operation; and a creation unit, configured to create, in response to a document creation operation in the current display interface, a second document associated with the first document;

wherein the second document is associated with the first document based on the target content.

In some embodiments, the present disclosure provides an electronic document processing apparatus, comprising: a determination module, configured to determine, in response to receiving a first document, permission information of a current user about a second document embedded in the first document; and a display module, configured to display relevant information of the second document and a permission application identifier in a preset style if the current user has no preset permission for the second document.

In some embodiments, the present disclosure provides an electronic document processing apparatus, comprising: a selection module, configured to select, in a current display interface, target document content from document content of a first document in response to a selection operation, the target document content being some document content of the first document; and a sharing module, configured to determine a target sharing object in response to a sharing operation and share the target document content to the target sharing object.

In some embodiments, the present disclosure provides a terminal, comprising: at least one memory and at least one processor, wherein the at least one memory is configured to store program code, and the at least one processor is configured to call the program code stored in the at least one memory to perform the method above.

In some embodiments, the present disclosure provides a storage medium, the storage medium storing program code, and the program code being used for performing the method above.

According to the electronic document processing method provided in the embodiments of the present disclosure, target content is determined, in a current display interface, from document content of a first document in response to a document content determination operation; and in response to a document creation operation in the current display interface, a second document associated with the first document is created, where the second document is associated with the first document based on the target content. The method provided in the embodiments of the present disclosure can quickly generate the second document associated with the content in the first document, and does not require user's repeated copy, paste, and association operations, thereby greatly improving user experience.

BRIEF DESCRIPTION OF THE DRAWINGS

These and other features, advantages and aspects of embodiments of the present disclosure will become more apparent in conjunction with the accompanying drawings and with reference to the following specific embodiments. Throughout the accompanying drawings, identical or similar appended marks indicate identical or similar elements. It should be understood that the accompanying drawings are schematic and that the elements and components are not necessarily drawn to scale.

DETAILED DESCRIPTION OF PREFERRED EMBODIMENTS

Embodiments of the present disclosure will be described in greater detail below with reference to the accompanying drawings. While certain embodiments of the present disclosure are shown in the accompanying drawings, it should be understood that the present disclosure may be implemented in various forms and should not be construed as being limited to the embodiments set forth herein, but instead are provided for a more thorough and complete understanding of the present disclosure. It should be understood that the accompanying drawings and embodiments of the present disclosure are for exemplary purposes only and are not intended to limit the scope of protection of the present disclosure.

It should be understood that the individual steps documented in the method embodiments of the present disclosure may be performed in sequence and/or in parallel. In addition, the method embodiments may include additional steps and/or omit to perform the steps illustrated. The scope of the present disclosure is not limited in this regard.

The term "includes" and variations thereof as used herein are open-ended, i.e., "includes but is not limited to". The term "based on" is "based, at least in part, on". The term "an embodiment" means "at least one embodiment"; the term "another embodiment" means "at least one additional embodiment"; the term "some embodiments" means "at least some embodiments". Definitions of other terms will be given in the description below.

Note that the concepts "first" and "second" mentioned in this disclosure are used only to distinguish between different devices, modules or units, and are not intended to define the order or interdependence of the functions performed by these devices, modules or units.

It should be noted that the reference to "one" in this disclosure is intended to be schematic and not limiting, and it should be understood by those skilled in the art to mean "one or more" unless the context clearly indicates otherwise.

The names of the messages or information interacting between the multiple devices in this disclosure are for illustrative purposes only and are not intended to limit the scope of those messages or information.

The embodiments of the present application are described in detail below in conjunction with the accompanying drawings.

Figure 1:
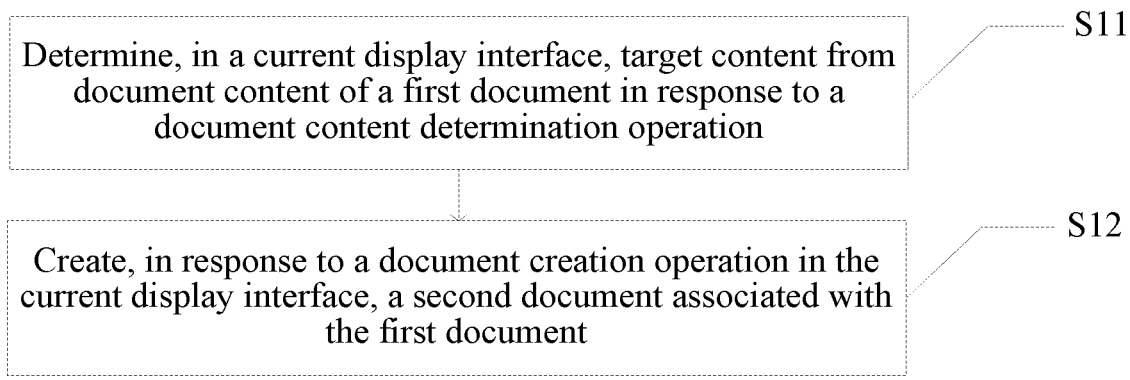
FIG. 1 is a flowchart of an electronic document processing method according to an embodiment of the present disclosure.

With reference to FIG. 1, an embodiment of the present disclosure provides an electronic document processing method. FIG. 1 is a flowchart of an electronic document processing method according to an embodiment of the present disclosure. The electronic document processing method includes the following steps.

S11: Determine, in a current display interface, target content from document content of a first document in response to a document content determination operation.

In some embodiments, the first document is an electronic document, and the current display interface may be a display interface for the document content of the first document. For example, the first document has a display area, and the current display interface may refer to the display area of the first document or may not the interface for the first document. The document content of the first document may include a variety forms, such as text or images. In some embodiments, the document content determination operation may be an operation on the document content of the first document. The document content determination operation may be a content input operation or a selection operation on existing content in the first document. In some embodiments, the document content determination operation may be performed on a control or by inputting a specific instruction. In some embodiments, the document content determination operation has associated target content, and the target content may be some content in the first document or generated based on the content in the first document. In some embodiments, because the target content is determined after the document content determination operation is performed, the target content may alternatively be content input to the first document in the document content determination operation.

S12: Create, in response to a document creation operation in the current display interface, a second document associated with the first document.

In some embodiments, the document content determination operation and a sharing operation are performed in a same display interface, for example, in the display interface of the first document. The second document is associated with the first document based on the target content. Because the association relationship between the second document and the first document is built when the second document is created, an additional operation of associating the second document and the first document is not required, and the efficiency is higher. The document creation operation may be in various forms such as a voice operation, a gesture operation, or an instruction input operation, or a combination thereof, and is not limited. The second document has an association relationship with the first document, and the content in the second document and the content in the first document are associated based on the target content, where the association may be in various manners. In some embodiments, both the first document and the second document display the target content, or the second document has an association identifier for viewing the target content. The target content in the first document may be used as a main body or title of the second document, or the second document references the target document. When the second document references the target content, a display style of the referenced target content in the second document may differ from that of other unreferenced content. In some embodiments, when the target content in the associated first document changes, the changed portion will be displayed on the second document, or that the target content in the first document has changed will be prompted.

In some embodiments of the present disclosure, the target content is determined through the document content determination operation, the second document associated with the first document is created, and the first document and the second document are associated based on the target content, thereby achieving rapid creation of the second document associated with the first document without copy, paste, and association operations, and greatly improving user experience.

In some embodiments of the present disclosure, the creating, in response to a document creation operation in the current display interface, a second document associated with the first document, includes: displaying a document creation control in response to the document content determination operation, and creating the second document associated with the first document in response to an operation on the document creation control. In some embodiments, the document creation control may be a control in the first document that is displayed in response to the document creation operation. After the document creation control is operated, the second document is created, and the association relationship between the second document and the first document is built. The operation on the document creation control may include one or more operations. The second document is created by displaying the document creation control to avoid incorrect operations.

In some embodiments of the present disclosure, the creating, in response to a document creation operation in the current display interface, a second document associated with the first document, includes: determining, in response to the document content determination operation, whether a document creation gesture or voice command is received, and creating the second document associated with the first document in response to receiving the document creation gesture or voice command. In some embodiments, the document creation operation may be a gesture operation or voice operation. In this case, a control is not required, so a software size may be reduced. This case is suitable for quickly creating the second document in scenarios where it is not convenient to connect a mouse, such as a mobile terminal or the like, and where the functions of left and right mouse buttons are occupied.

In some embodiments of the present disclosure, the determining, in a current display interface, target content from document content of a first document in response to a document content determination operation includes: in response to a selection operation on some content in the first document, determining the target content based on the some content. In some embodiments, the first document displays document content, the some content is some document content. The document content determination operation is a selection operation to select some content in the first document, and the target content is determined based on the selected content. For example, the selected content may be directly set as the target content. Alternatively, the target content may be a paragraph(s) where the some content is located, for example, selecting some content in a paragraph is considered as selecting the entire paragraph, or selecting a title of a paragraph is considered as selecting the paragraph. The selection operation may be done either through a mouse or through a selection box.

In some embodiments of the present disclosure, the determining, in a current display interface, target content from document content of a first document in response to a document content determination operation includes: in response to an input operation on a preset symbol and content information, determining the target content based on the content information. In some embodiments, the preset symbol may be a symbol used less frequently, such as "@" and "R". The preset symbol is input to indicate that the second document is to be created, and cooperates with the content information input by a user to determine the target content, thereby accurately indicating the content that the user desires to associate. The content information may be one or a combination of text or image information. In some embodiments, a paragraph(s) where the content information is located may be searched in the first document as the target content. This method can achieve customized quick association of multiple paragraphs of content.

In some embodiments of the present disclosure, determining the target content based on the some content includes: determining the target content to be the some content, content obtained by analyzing the some content, a combination of the some content and other content, a combination of other content and the content obtained by analyzing the some content, a paragraph(s) where the some content is located, a paragraph(s) identified by the some content, or content converted from the some content. In some embodiments, the selected content may be directly used as the target content, so that the second document may be directly associated with the selected content. In other embodiments, the selected content is used for analysis to determine the target content, for example, a paragraph(s) where the some content is located is determined, and the target content is set to be the paragraph paragraph(s) where the some content is located. The some content may identify a paragraph(s), for example, the some content is a title of a paragraph, and the target content is the paragraph identified by the title of the paragraph. In this case, the title of the paragraph is selected to select the entire paragraph, thereby reducing operations. The target content may alternatively be the content converted from the some content, for example, the some content is converted in language to obtain the target content. In other embodiments, the some content is combined with other content after analysis or without analysis. In some embodiments, the other content includes relevant information about the first document, such as name, author, and creation time. In other embodiments, the other content may alternatively be user-defined content. The combination with the other content makes the target content clearer and more detailed.

In some embodiments of the present disclosure, the some content is at least one content block, and each content block is a unit used for carrying the content of the first document. In some embodiments, the content of the first document includes at least one content block, and the target content may be a content block(s) corresponding to some content. In some embodiments, the first document is a structured document including a plurality of content blocks, and the content blocks may be in various forms such as text or images. A content block may be a line of content, a paragraph of content, or multiple paragraphs of content. By setting a content block, an entire content block may not be selected when some content is selected, but a portion of the content block is selected, which is considered as selecting the entire content block, thereby improving operational efficiency. Moreover, in practical work, electronic documents often have certain structural compositions. An electronic document is composed of one or more preset portions, and each portion has respective logic and content. Therefore, the blocks of a document are more suitable for people's usage habits.

In other embodiments, a new content block may alternatively be generated based on some content selected from one content block of the first document, and the new content block is associated to the created second document. This improves the flexibility of associating the first document and the second document.

In some embodiments, the displaying a document creation control in response to the document content determination operation includes: displaying the document creation control in response to a trigger operation on a first control associated with some content in the first document; or displaying a second control including the document creation control in response to a selection operation on some content in the first document. In some embodiments, the document content determination operation may include, for example, a click operation on the first control or a cursor focus operation, and the document content corresponding to the first control or the cursor focus operation is denoted as the selected target content. Similarly, the document content determination operation may alternatively be a selection operation on an option in the first control, and the first control may be a resident control, that is, a continuously displayed control, or a control displayed after satisfying some conditions, such as a control only displayed after some content of the first document is selected. The document creation control may be displayed only after the first control is triggered. In other embodiments, the document creation control is directly displayed in a second control. For example, after some content of the first document is selected, a menu bar is displayed, and a new menu in the menu bar is triggered to display the document creation control. In other embodiments, the document creation control may alternatively be directly displayed in the menu bar.

In some embodiments, the method includes: displaying the document creation control and determining the target content in response to the input operation on the preset symbol and the content information; and creating the second document in response to the operation on the document creation control and using the target content as a title of the second document. In some embodiments, the preset symbol, or the preset symbol and the content information after the symbol, is/are input to evoke the document creation control. The input content information is used for determining the target content. The target content may be the input content information (the input content information may be text or another type of content) or associated information determined according to the input content information, for example, the associated information may be information used for indicating features of the first document. For example, in some embodiments, the input content information is "current document title+author", the title and author of the first document may be directly obtained as the target content, and the target content may be used as the title of the second document when the second document is created. For example, the preset symbol is "@", "@ AAA" is input in the first document, the document creation control is displayed, "AAA" is obtained as the target content, and "AAA" is used as the title and/or main body of the second document after the second document is determined to be created. In this case, the title and/or some main body content of the document may be specified before the second document is created, thereby reducing operation steps, making content creation more continuous, and avoiding interruption of ideas.

In some embodiments of the present disclosure, the association between the content in the second document and the content in the first document based on the target content includes one or more of the following: both the first document and the second document have the target content, where the target content is determined as the main body content, title content, content with a reference relationship, or content with a connection relationship in the second document. In some embodiments, the target content is the content in the first document, and the second document has the target content of the first document, which may serve as the main body or title of the second document. The target content in the second document has a reference relationship or connection relationship with the target content in the first document, where the reference relationship includes: when a first content block of the first document is referenced by the second document, both the first document and the second document display the first content block and may achieve one-way or two-way synchronization, for example, amendment to the first content block in the first document may be synchronized to the second document, and/or amendment to the first content block in the second document may be synchronized to the first document. The connection relationship includes: when a second content block of the first document is connected to the second document, a connection identifier of the second content block may be displayed in the second document, and in response to triggering the connection identifier, content of the second content block may be obtained and displayed in the second document.

In some embodiments of the present disclosure, a document identifier of the second document is displayed in the first document. In some embodiments, the content in the first document is associated with the second document. For example, the second document is created based on selected content of the first document, so the document identifier of the second document is displayed to represent the association relationship. In this case, when the first document is amended, the associated second document can be noticed. Especially when the content in the second document and the content in the first document have a reference relationship and can be synchronized, incorrect amendment to the second document due to negligence on the second document is avoided.

In some embodiments, some embodiments of the present disclosure further include: displaying a sharing identifier at an associated position of the document identifier of the second document, and sharing the second document to a target sharing object in response to a sharing operation. In some embodiments, the target sharing object is a receiver, for example, the second document may be shared by clicking any user's avatar. Of course, the receiver is not limited to one user and may share the second document to a group. In this case, the target sharing object may be a group. A target object may be notified by sending a notification message. If the target sharing object is a single user, a notification message is sent. If the target sharing object is a group, a group message is sent. After the target object receives the second document, a notification message may be displayed to indicate that the second document has been received by the target sharing object.

In some embodiments of the present disclosure, the sharing the second document to a target sharing object in response to a sharing operation includes: displaying a sharing information edit control in response to a trigger operation on the sharing identifier, the sharing information edit control being used for determining sharing information; and sharing the second document to the target sharing object based on the determined sharing information. In some embodiments, the second document may be first created, then the sharing identifier of the second document is displayed, and the second document is shared through the sharing identifier. The first creation and then sharing of the second document facilitate direct sharing of the second document to other objects, and reduce repeated creation of the second document.

In some embodiments of the present disclosure, the creating a second document associated with the first document in response to a document creation operation includes: displaying a sharing information edit control in response to an operation of creating and sharing a document, the sharing information edit control being used for determining sharing information; and creating the second document associated with the first document in response to a sharing information confirmation operation, and sharing the second document to the target sharing object based on the determined sharing information. In some embodiments, two actions of creating the second document and sharing the second document may be performed through one operation, for example, a "create and share a document" control may be displayed, and the control is triggered to directly create and share the second document, thereby reducing user operation and simplifying processes. In some embodiments, the process of determining sharing information may be the process of confirming sharing information in any embodiment of the present disclosure.

In some embodiments, the determining sharing information includes one or more of the following content: determining title information of the second document, determining the target sharing object of the second document and determining a permission of the target sharing object. In some embodiments, the sharing information may be input by selecting or inputting in the sharing information edit control, and the sharing information may include the target sharing object. For example, a contact list is displayed in the sharing information edit control, and the user clicks one or more contacts in the contact list to share the second document to the clicked contact(s). The shared second document may specify the permission of the shared person, for example, whether the shared person can read or can both read and edit.

In some embodiments, the determining title information of the second document includes: determining a title of the second document according to content input in a title edit area in response to an input operation in the title edit area of the sharing information edit control; or displaying, in the title edit area of the sharing information edit control, default title information determined based on the target content, and determining the default title information as the title of the second document in response to the sharing information confirmation operation. In some embodiments, the determining a title of the second document according to content input in a title edit area in response to an input operation in the title edit area of the sharing information edit control includes: displaying, in the title edit area, the default title information determined based on the target content, and determining the title of the second document in response to an amendment operation on the default title information.

In some embodiments, when the second document is shared, the title of the shared second document may be amended. The title of the shared second document displayed on a receiver (such as the target sharing object) is the same or different from the title of the second document displayed on a sender. The user may manually input the title in the title edit area, or use the default title information, or edit the default title information, for example, display the title of the second document before being shared as the default title information in the title edit area, and then the user may edit or use the default title information. Therefore, the title of the second document displayed on the receiver after sharing may be different from the title displayed on the sender when the second document is not shared, thereby hiding some information according to user's needs.

In some embodiments, the default title information includes corresponding title information of the target content in the first document, or the default title information includes the target content, or the default title information includes content obtained by analyzing the target content. In some embodiments, the target content may be directly used as the default title information or the default title information may be determined based on the target content. A preset word count may be set, and the target content is used as a default title when the word count of the target content is less than the preset word count, or the default title information is generated according to the target content when the word count of the target content is greater than the preset word count, for example, the target content may be summarized, and the summary information is used as the default title information. Because the default title information reflects the target content, the user of the target sharing object can roughly determine the content.

In some embodiments, the corresponding title information of the target content in the first document includes: title information of the content block where the target content is located in the first document, or combined information of the title information of the content block where the target content is located and the title information of the first document. In some embodiments, the content block has a corresponding title. For example, when a user writes a document, subtitles are usually set for different parts. The subtitle set by the user of the first document can reflect the content of the target content, and can reflect the information of the target content more comprehensively after being combined with the title information of the first document.

In some embodiments, the method further includes: adjusting a display style of the target content in the first document to a target display style after generating the second document. In some embodiments, the target content may be selected content in the first document, or may be content information input together with a preset symbol. By adjusting the display style of the target content in the first document to the target display style, the target content is distinguished from other content in the first document, and the user may be reminded to generate a document based on the target content.

In some embodiments, the adjusting to the target display style includes one or more of the following content: adding a box or icon for an area where the target content is located, or changing a text style or layout style of the target content. In some embodiments, the area of the target style may be surrounded by a box, or the font of the target content may be changed to a different font from other parts. For example, the first document is originally in song typeface, and the font of the target content may be in regular script. Alternatively, the layout of the target content may also be changed, for example, changed to italic layout. By adjusting to the target display style, repetition with the existing style in the first document is avoided, the user is prompted, or misunderstanding of the user is avoided. For example, by distinguishing the target display style from the style when the content is selected, the user may be prevented from mistakenly thinking that some content is selected.

In some embodiments, a display style of the document identifier of the second document is changed to a second style in response to a delete event about the second document, the second style being different from a first style of the identifier of the second document in the first document before the second document is deleted. In some embodiments, the display style of the identifier of the second document will be changed after the second document is deleted, so that the status of the second document may be directly determined from the display style without opening the second document. In some embodiments, the second style includes a prompt message that the second document is deleted, so that the user can intuitively determine that the second document has been deleted.

In some embodiments of the present disclosure, the sharing the second document to a target object includes: sending a link to the second document to the target sharing object; or sending the second document to the target sharing object. In some embodiments, the second document may be directly sent to the target sharing object, so that networking is not required when the second document is viewed and edited, and the difference between the second document and the target content may be compared during networking and adjusted accordingly. In other embodiments, the link to the second document is sent to the target sharing object, so that the second document may be stored in a server or directly stored in the first document, that is, only one document is stored to reduce requirements for a storage space.

Figures 2A, 2B, 2C:
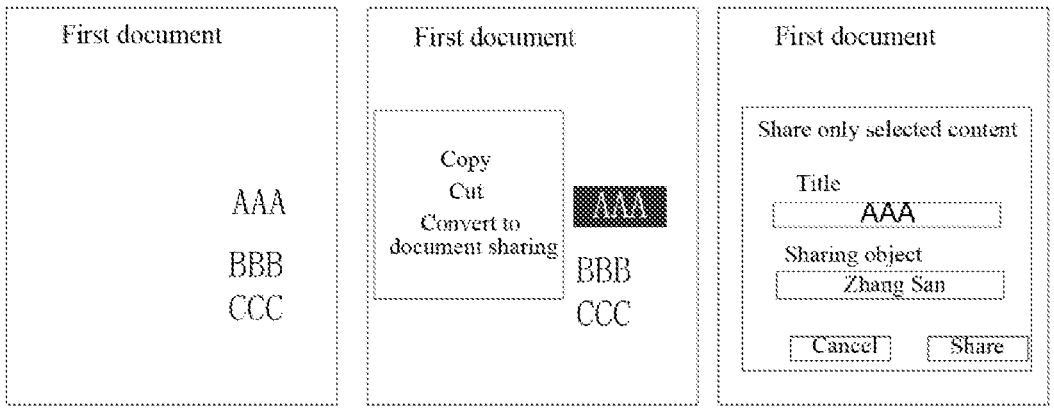
FIGS. 2(a), 2(b), and 2(c) are schematic diagrams of a first document processing method according to an embodiment of the present disclosure.
Figure 3:
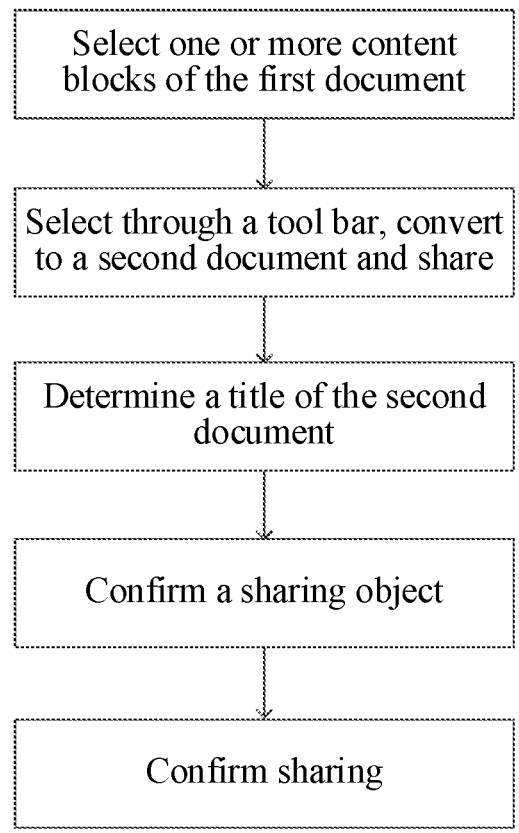
FIG. 3 is a flowchart of another electronic document processing method according to an embodiment of the present disclosure.

In order to better illustrate the method provided in the embodiments of the present disclosure, a specific embodiment is schematically illustrated below, but the scope of protection of the present disclosure should not be limited thereto. The following description refers to FIGS. 2 and 3. As shown in FIG. 2(*a*), "AAABBBCCC" in a first document is first document content, the first document is a structured document including a plurality of content blocks, a user with edit permission selects one or more content blocks in the first document, and the selected content block is target content. Assuming that the user selects "AAA", the selected "AAA" is the target content. After the target content is selected, as shown in FIG. 2(*b*), its display style is changed and a tool bar is displayed, the tool bar including a document creation option "Convert to document sharing". In some embodiments, after the document creation option is triggered, a pop-up box pops up, as shown in FIG. 2(*c*). A title box in the pop-up box displays default title information, and a sharing object is selected in a sharing object box, where the default title information is a title of a paragraph where the target content is located, which is "AAA" in this embodiment. The user confirms a title of a second document, and then content of the second document is generated according to the target content, where the second document further includes "AAA", and the "AAA" in the second document has a reference relationship with the "AAA" in the first document to achieve one-way or two-way synchronization. In other embodiments, after a document creation option is triggered, a pop-up box pops up, the target content is used as the title of the second document, and the user may choose to confirm or edit the title of the second document. After the second document is created, a sharing object is selected, for example, a person or group name is selected from a contact list for sharing, and read or edit rights may alternatively be granted. After the second document is created, a document identifier of the second document will be displayed in the first document, and when the second document is deleted, the document identifier will display a prompt message and display an icon and title of the deleted second document. The sharing object will receive the prompt message. If the sharing object is a person, a notification will be received. If the sharing object is a group, a group message will be received. A sharing identifier is displayed at an associated position of the second document in the first document, such as the periphery of the second document, and then the user may share the second document to other sharing objects through a sharing operation. During sharing, the title of the second document defaults to "AAA", and users may independently edit or directly use the title.

When an electronic document is cooperated, the electronic document will be shared. However, in some cases, some users who have restricted permissions may only be desired to edit or read some content in the electronic document. If the some content in the first document is copied and pasted to form a new electronic document, the new electronic document is shared to the users with restricted permissions, and then amended content is pasted to the first document after the new electronic document is amended, the work efficiency is low, the change in the content of the first document or new electronic document cannot be known in a timely manner, and the user experience is poor due to user's repeated operations of copying, pasting, and creating a new electronic document. Therefore, in some embodiments of the present disclosure, only the second document is shared to the target object, so the sharing object can only view or edit the content in the second document, which achieves differentiated management of permissions. Moreover, because the content of the second document is associated with the content of the first document, the first document can be cooperated, and repeated operations of copying, pasting, and creating a new document are not required, thereby greatly improving the user experience.

Figure 4:
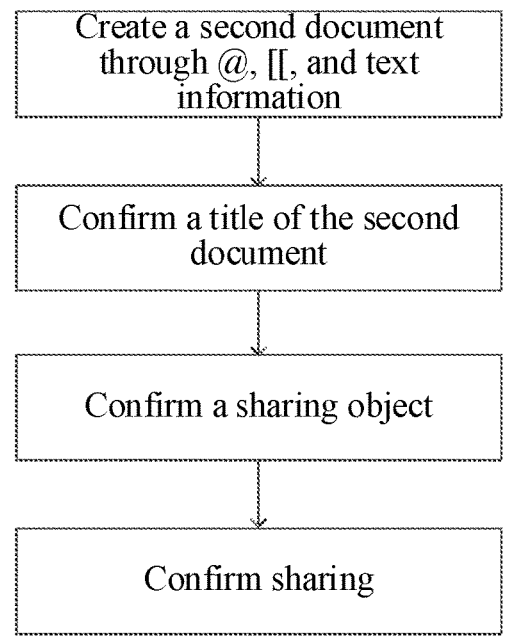
FIG. 4 is a flowchart of another electronic document processing method according to an embodiment of the present disclosure.
Figures 5A, 5B, 5C:
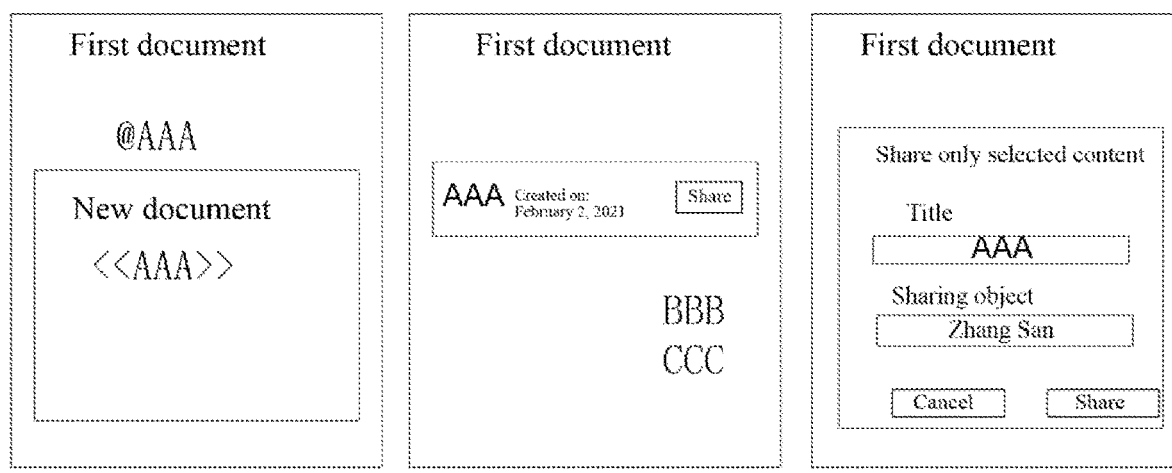
FIGS. 5(*a*), 5(*b*), and 5(*c*) are schematic diagrams of another electronic document processing method according to an embodiment of the present disclosure.

In other embodiments of the present disclosure, as shown in FIGS. 4 and 5, another electronic document processing method is provided. As shown in FIG. 5(*a*), a user with edit permission inputs a guidance symbol such as "@" or "[[" in a first document and then inputs content information such as text, and then a pop-up window prompts to create a second document.

The content information "AAA" input in FIG. 5(*a*) will be used as a default title of the second document. The user confirms the title of the second document to complete the creation of the second document. As shown in FIG. 5(*b*), a document identifier of the second document is displayed in the first document after the creation is completed, and an associated area of the document identifier has a sharing identifier. As shown in FIG. 5(*c*), a pop-up window is displayed by triggering the sharing identifier, the pop-up window displays the title of the shared second document, the user may choose to accept the title or amend the title before accepting, then a contact list pops up, and the user selects a sharing object in the contact list and sends the second document to the sharing object. If the sharing object is a single user, the sharing user will receive a notification. If the sharing object is a group user, there will be a message prompt in the group.

Figure 6:
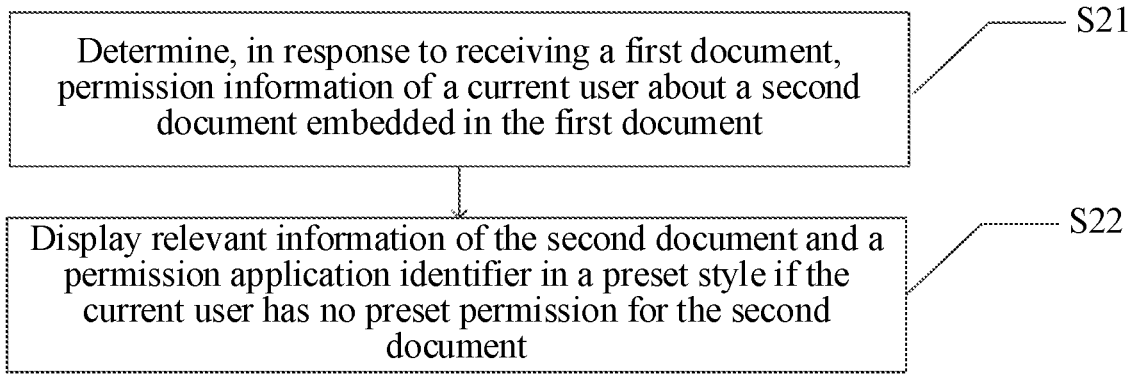
FIG. 6 is a schematic diagram of another electronic document processing method according to an embodiment of the present disclosure.

In some embodiments of the present disclosure, another electronic document processing method is further provided, as shown in FIG. 6, including: S21: Determine, in response to receiving a first document, permission information of a current user about a second document embedded in the first document.

In some embodiments, the first document may be an electronic document, and first document content of the first document may include at least one content block. In this embodiment, the first document may be any first document in the foregoing embodiments, where the first document is embedded with the second document, and the second document may be any second document mentioned above. Different users have different permissions for the second document, including whether the current user may read or edit the second document.

S22: Display relevant information of the second document and a permission application identifier in a preset style if the current user has no preset permission for the second document.

Figure 7:
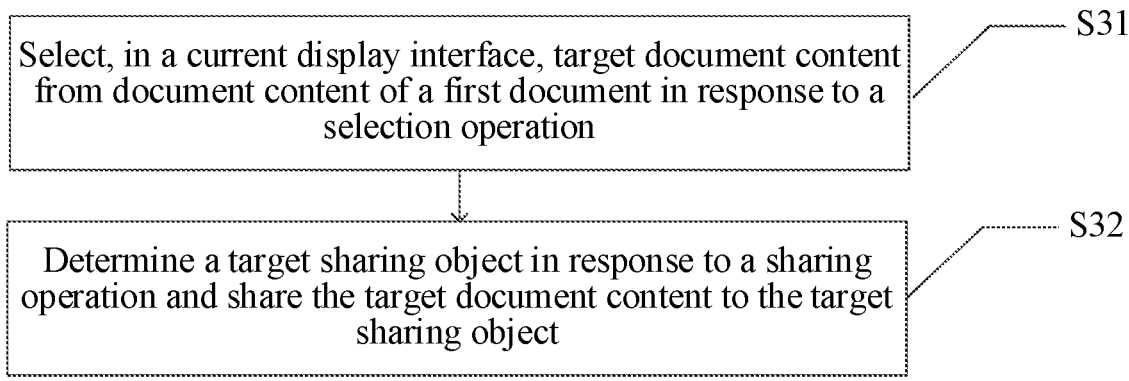
FIG. 7 is a schematic diagram of another electronic document processing method according to an embodiment of the present disclosure.

In some embodiments of the present disclosure, the permission application identifier includes owner information of the second document and/or a permission application entry, the permission application entry being used for outputting a permission application interface after being triggered. In some embodiments, the owner information of the second document is displayed for the user to get in touch with an owner of the second document for permission application, and the permission application entry is displayed for direct permission application. In some embodiments, if the current user has no preset permission for the second document, the relevant information of the second document and the permission application identifier will be displayed, where the preset permission may be a read or edit permission, and the permission application identifier may be displayed in the first document. In this case, the user may know through the display style whether he has permission without opening the second document. On the other hand, the permission application identifier is provided in the absence of the preset permission, so that the user can quickly apply for permission, a path of permission application is shortened, and operational efficiency is improved, where the permission application identifier may be a link, for example. In some embodiments of the present disclosure, when the first document is opened, relevant information of the first document and the permission application identifier are displayed in a preset style. In some embodiments, when the user opens the first document to view content, the relevant information of the first document and the permission application identifier are displayed in the preset style. In some embodiments, another electronic document processing method is provided, as shown in FIG. 7, including:

S31: Select, in a current display interface, target document content from document content of a first document in response to a selection operation.

In some embodiments, the first document is an electronic document, and the target document content is some content in the first document. For example, when the first document includes a plurality of content blocks, the target document content may be one or more content blocks. The selection operation may be a selection operation on the document content of the first document, and selected document content is directly used as the target document content. Alternatively, the selection operation may be a selection operation on a control associated with the document content, and corresponding document content is determined as the target document content according to the control.

S32: Determine a target sharing object in response to a sharing operation and share the target document content to the target sharing object.

In some embodiments, the sharing may be performed through a sharing identifier displayed in the target document content. The target sharing object may be a single user or a group, a notification message is sent when the target sharing object is a single user, and a group notification message is sent when the target sharing object is a group. In some embodiments of the present disclosure, some document content of the first document, not the entire document, may be shared, which facilitates permission management. Only the portion required to be shared is shared when other users are not desired to view the full text of the first document, that is, a view permission for the target document content is opened only for the target sharing object, the target sharing object can view only the shared target document content, and other content of the first document is not displayed.

In some embodiments, determining a target sharing object in response to a sharing operation and sharing the target document content to the target sharing object includes: creating a second document in response to the sharing operation, and sharing the second document to the target sharing object, where document content of the second document includes the target document content. In some embodiments, the second document including the target document content may be generated and shared to the target sharing object. In this case, the second document is sent to the target sharing object, or a link to the second document is shared to the target sharing object. The shared second document and the first document may have an association relationship through the target document content. For example, after the target document content in the first document is amended, the target document content in the second document is correspondingly amended. After the target document content in the second document is amended, the target document content in the first document is correspondingly amended. Therefore, user's cooperation is facilitated.

In some embodiments, the determining a target sharing object in response to a sharing operation and sharing the target document content to the target sharing object includes: obtaining a first link to the first document in response to the sharing operation, generating a second link according to the first link and a scope of the target document content in the first document, and sharing the second link to the target sharing object, the second link being used for indicating that a receiving end of the second link displays the target document content and hides some other content or all other content in the first document except the target document content. In some embodiments, the second link is created based on the link to the first document. The first link is a link that displays the first document after being triggered. Information indicating the scope of the target document content in the first document is added to the first link to the first document to generate the second link. The first document is found from the server based on the second link after the second link is triggered, then the position of the target document content is found based on the scope information, and only the target document content is displayed. In this case, a receiver is prevented from viewing undesired content.

Figure 8:
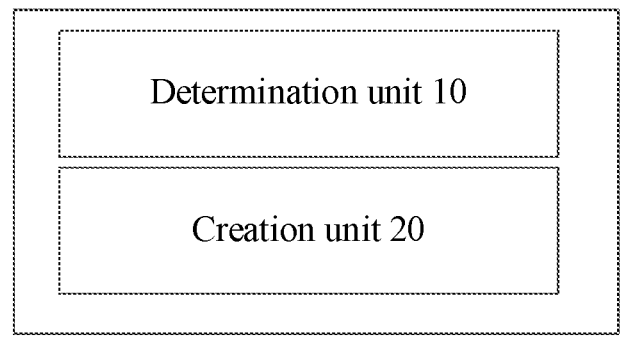
FIG. 8 is a composition diagram of an electronic document processing apparatus according to an embodiment of the present disclosure.

In some embodiments of the present disclosure, an electronic document processing apparatus is further provided, as shown in FIG. 8, including:

a determination unit 10, configured to determine target content associated with a document content determination operation in a display interface of a first document in response to the document content determination operation; and a creation unit 20, configured to create a second document associated with the first document based on document content determination operation in response to a document creation operation. The content in the second document and the content in the first document are associated based on the target content.

In some embodiments of the present disclosure, the creation unit 20 creating, in response to a document creation operation in the current display interface, a second document associated with the first document, includes: displaying a document creation control in response to the document content determination operation, and creating the second document associated with the first document in response to an operation on the document creation control; or determining, in response to the document content determination operation, whether a document creation gesture or voice command is received, and creating the second document associated with the first document in response to receiving the document creation gesture or voice command.

In some embodiments of the present disclosure, the determination unit 10 determining, in a current display interface, target content associated with document content of the first document in response to a document content determination operation includes: in response to a selection operation on some content in the first document, determining the target content based on the some content; or in response to an input operation on a preset symbol and content information, determining the target content based on the content information.

In some embodiments of the present disclosure, the determining the target content based on the some content includes: determining the target content to be the some content, content obtained by analyzing the some content, a combination of the some content and other content, a combination of other content and the content obtained by analyzing the some content, a paragraph(s) where the some content is located, a paragraph(s) identified by the some content, or content converted from the some content.

In some embodiments of the present disclosure, the other content includes relevant information of the first document.

In some embodiments of the present disclosure, the some content is at least one content block, and each content block is a unit used to carry the content of the first document.

In some embodiments, the displaying a document creation control in response to the document content determination operation includes: displaying the document creation control in response to a trigger operation on a first control associated with some content in the first document; or displaying a second control including the document creation control in response to a selection operation on some content in the first document.

In some embodiments of the present disclosure, the apparatus further includes: a display unit, configured to display a document identifier of the second document in the first document.

In some embodiments of the present disclosure, the display unit is further configured to display a sharing identifier at an associated position of the document identifier of the second document, and the electronic document processing apparatus further includes a control unit configured to share the second document to a target sharing object in response to a sharing operation.

In some embodiments of the present disclosure, the sharing the second document to a target sharing object in response to a sharing operation includes: displaying a sharing information edit control in response to a trigger operation on the sharing identifier, the sharing information edit control being used for determining sharing information; and sharing the second document to the target sharing object based on the determined sharing information.

In some embodiments of the present disclosure, the creation unit creating a second document associated with the first document in response to a document creation operation includes: displaying a sharing information edit control in response to an operation of creating and sharing a document, the sharing information edit control being used for determining sharing information; and creating the second document associated with the first document in response to a sharing information confirmation operation, and sharing the second document to the target sharing object based on the determined sharing information.

In some embodiments of the present disclosure, the determining sharing information includes one or more of the following content: determining title information of the second document, determining the target sharing object of the second document, and determining a permission of the target sharing object.

In some embodiments of the present disclosure, the determining title information of the second document includes: determining a title of the second document according to content input in a title edit area in response to an input operation in the title edit area of the sharing information edit control; or displaying, in the title edit area of the sharing information edit control, default title information determined based on the target content, and determining the default title information as the title of the second document in response to the sharing information confirmation operation.

In some embodiments of the present disclosure, the determining a title of the second document according to content input in a title edit area in response to an input operation in the title edit area of the sharing information edit control includes: displaying, in the title edit area, the default title information determined based on the target content, and determining the title of the second document in response to an amendment operation on the default title information.

In some embodiments of the present disclosure, the default title information includes corresponding title information of the target content in the first document, or the default title information includes the target content, or the default title information includes content obtained by analyzing the target content.

In some embodiments of the present disclosure, the corresponding title information of the target content in the first document includes: title information of the content block where the target content is located in the first document, or combined information of the title information of the content block where the target content is located and the title information of the first document.

In some embodiments of the present disclosure, the apparatus further includes a control unit configured to adjust a display style of the target content in the first document to a target display style after the second document is generated.

In some embodiments of the present disclosure, the adjusting to the target display style includes one or more of the following content: adding a box or icon for an area where the target content is located, or changing a text style or layout style of the target content.

In some embodiments of the present disclosure, the apparatus further includes: a control unit, configured to change a display style of the document identifier of the second document to a second style in response to a delete event about the second document, the second style being different from a first style of the document identifier of the second document in the first document before the second document is deleted.

In some embodiments of the present disclosure, the association between the second document and the first document based on the target content includes: both the first document and the second document display the target content, or the second document references the target content.

Figure 9:
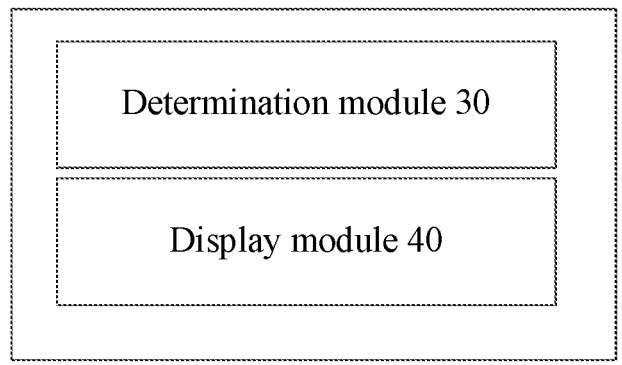
FIG. 9 is a composition diagram of an electronic document processing apparatus according to an embodiment of the present disclosure.

Some embodiments of the present disclosure provide an electronic document processing apparatus, as shown in FIG. 9, including:

a determination module 30, configured to determine, in response to receiving a first document, permission information of a current user about a second document embedded in the first document; and a display module 40, configured to display relevant information of the second document and a permission application identifier in a preset style if the current user has no preset permission for the second document.

In some embodiments of the present disclosure, the permission application identifier includes owner information of the second document and/or a permission application entry, the permission application entry being used for outputting a permission application interface after being triggered. In some embodiments of the present disclosure, when the first document is opened, relevant information of the first document and the permission application identifier are displayed in a preset style. In some embodiments, when the user opens the first document for viewing, the relevant information of the first document and the permission application identifier are displayed in the preset style.

Some embodiments of the present disclosure provide an electronic document processing apparatus, including:

a selection module, configured to select, in a current display interface, target document content from document content of a first document in response to a selection operation, the target document content being some document content of the first document; and a sharing module, configured to determine a target sharing object in response to a sharing operation and share the target document content to the target sharing object.

In some embodiments of the present disclosure, the sharing module determining a target sharing object in response to a sharing operation and sharing the target document content to the target sharing object includes: creating a second document in response to the sharing operation, and sharing the second document to the target sharing object, where document content of the second document includes the target document content.

In some embodiments of the present disclosure, the sharing module determining a target sharing object in response to a sharing operation and sharing the target document content to the target sharing object includes: obtaining a first link to the first document in response to the sharing operation, generating a second link according to the first link and a scope of the target document content in the first document, and sharing the second link to the target sharing object, the second link being used for indicating that a receiving end of the second link displays the target document content and hides some other content or all other content in the first document except the target document content.

The embodiment of the apparatus substantially corresponds to the embodiment of the method, so relevant parts may refer to the parts of the embodiment of the method. The embodiments of the apparatuses described above are merely illustrative, where the modules illustrated as separate modules may or may not be separate. Some or all of the modules may be selected according to actual needs to achieve the objectives of the solutions of the embodiments. Those of ordinary skill in the art may understand and implement without any creative effort.

The methods and apparatuses of the present disclosure are described above based on the embodiments and application examples. In addition, the present disclosure further provides a terminal and a storage medium, which are described below.

Figure 10:
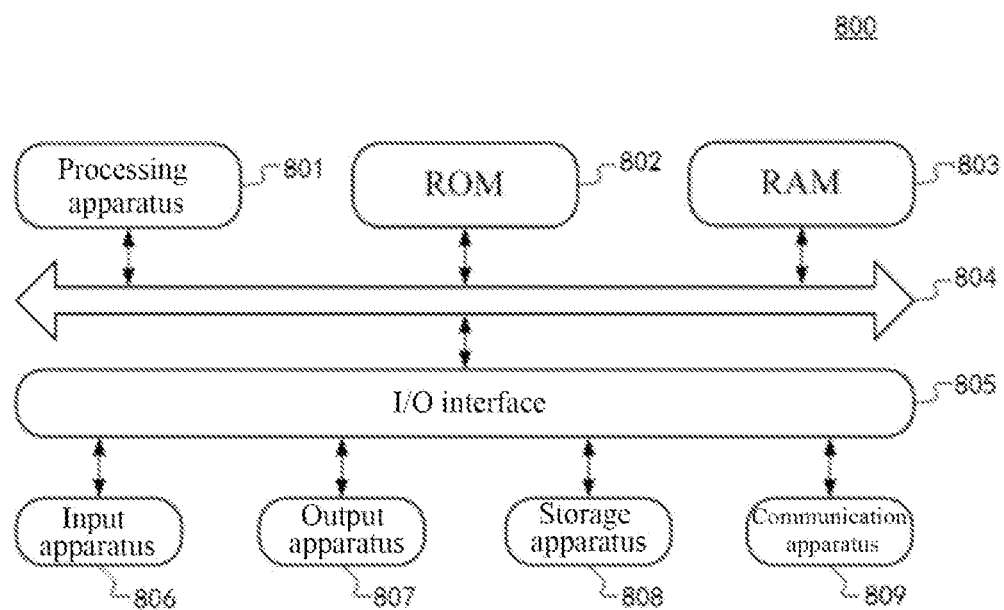
FIG. 10 is a schematic structural diagram of an electronic device according to an embodiment of the present disclosure.

Reference is made below to FIG. 10, which illustrates a schematic diagram of the structure of an electronic device (e.g., a terminal device or a server) 800 suitable for use in implementing embodiments of the present disclosure. Terminal devices in embodiments of the present disclosure may include, but are not limited to, mobile terminals such as a cell phone, a laptop computer, a digital radio receiver, a PDA (personal digital assistant), a PAD (tablet computer), a PMP (portable multimedia player), an in-vehicle terminal (e.g., an in-vehicle navigation terminal), and the like, and a fixed terminal such as a digital TV, a desktop computer, and the like. The electronic device illustrated in the figures is only an example and should not impose any limitation on the functionality and scope of use of embodiments of the present disclosure.

The electronic device 800 may include a processing apparatus (e.g., central processor, graphics processor, etc.) 801 that may perform various appropriate actions and processes based on programs stored in a read-only memory (ROM) 802 or loaded from a storage apparatus 808 into a random access memory (RAM) 803. Also stored in RAM 803 are various programs and data required for the operation of electronic device 800.

The processing apparatus 801, ROM 802, and RAM 803 are connected to each other via bus 804. The input/output (I/O) interface 805 is also connected to the bus 804.

Typically, the following devices can be connected to I/O interface 805: input apparatus 806 including, for example, touch screens, touch pads, keyboards, mice, cameras, microphones, accelerometers, gyroscopes, etc.; output apparatus 807 including, for example, liquid crystal displays (LCDs), speakers, vibrators, etc.; storage apparatus 808 including, for example, magnetic tapes, hard drives, etc.; and communication apparatus 809. communication apparatus 809 may allow the electronic device 800 to communicate wirelessly or wired with other devices to exchange data. Although the drawings illustrate the electronic device 800 with various devices, it should be understood that it is not required to implement or have all of the devices illustrated. More or fewer devices may alternatively be implemented or available.

In particular, according to embodiments of the present disclosure, the process described above with reference to the flowchart may be implemented as a computer software program. For example, embodiments of the present disclosure include a computer program product comprising a computer program carried on a computer readable medium, the computer program comprising program code for performing the method shown in the flowchart. In such an embodiment, the computer program may be downloaded and installed from a network via a communication device 809, or from a storage apparatus 808, or from a ROM 802. When this computer program is executed by the processing apparatus 801, the above-described functions as defined in the method of this disclosed embodiment are performed.

It is to be noted that the computer-readable medium described above in this disclosure may be a computer-readable signal medium or a computer-readable storage medium or any combination of the above. The computer readable storage medium may be, for example—but not limited to—an electrical, magnetic, optical, electromagnetic, infrared, or semiconductor system, device, or device, or any combination of the above. More specific examples of computer-readable storage media may include, but are not limited to: electrically connected with one or more wires, portable computer disks, hard disks, random access memory (RAM), read-only memory (ROM), erasable programmable read-only memory (EPROM or flash memory), optical fiber, portable compact disk read-only memory (CD-ROM), optical storage devices, or any of the above, magnetic memory devices, or any suitable combination of the foregoing. In the present disclosure, a computer-readable storage medium may be any tangible medium that contains or stores a program that may be used by or in combination with an instruction execution system, device, or device. And in the present disclosure, a computer-readable signal medium may include a data signal propagated in the baseband or as part of a carrier wave that carries computer-readable program code. Such propagated data signals may take a variety of forms, including but not limited to electromagnetic signals, optical signals, or any suitable combination of the foregoing. Computer-readable signal medium can also be any computer-readable medium other than computer-readable storage media, the computer-readable signal medium can send, propagate or transmit the program for use by or in combination with the instruction execution system, device or device. The program code contained on the computer-readable medium may be transmitted using any suitable medium, including but not limited to: wire, fiber optic cable, RF (radio frequency), etc., or any suitable combination of the above.

In some implementations, the client, server may communicate using any currently known or future developed network protocol such as HTTP (HyperText Transfer Protocol), and may interconnect with any form or medium of digital data communication (e.g., a communication network). Examples of communication networks include local area networks ("LANs"), wide area networks ("WANs"), inter-networks (e.g., the Internet), and end-to-end networks (e.g., ad hoc end-to-end networks), as well as any currently known or future developed networks.

The above computer readable medium may be contained in the above electronic device; or it may be present separately and not assembled into the electronic device.

The above computer readable medium carries one or more programs which, when executed by the electronic device, cause the electronic device to perform the methods of the present disclosure as described above.

Computer program code for performing the operations of the present disclosure may be written in one or more programming languages or combinations thereof, said programming languages including object-oriented programming languages—such as Java, Smalltalk, C++, including conventional procedural programming languages—such as "C" language or similar programming languages. The program code may be executed entirely on the user's computer, partially on the user's computer, as a stand-alone package, partially on the user's computer and partially on a remote computer, or entirely on a remote computer or server. In the case of a remote computer, the remote computer may be connected to the user computer over any kind of network—including a local area network (LAN) or a wide area network (WAN)—or, alternatively, may be connected to an external computer (e.g., using an Internet service provider to connect over the Internet).

The flowcharts and block diagrams in the accompanying drawings illustrate the possible implementations of the architecture, functionality, and operation of systems, methods, and computer program products in accordance with various embodiments of the present disclosure. At this point, each box in a flowchart or block diagram may represent a module, program segment, or portion of code that contains one or more executable instructions for implementing a specified logical function. It should also be noted that in some implementations as replacements, the functions indicated in the boxes may also occur in a different order than that indicated in the accompanying drawings. For example, two boxes represented one after the other can actually be executed in substantially parallel, and they can sometimes be executed in the opposite order, depending on the function involved. Note also that each box in the block diagram and/or flowchart, and the combination of boxes in the block diagram and/or flowchart, may be implemented with a dedicated hardware-based system that performs the specified function or operation, or may be implemented with a combination of dedicated hardware and computer instructions.

The units described in the embodiments of the present disclosure may be implemented by means of software, or by means of hardware. Wherein, the name of the unit does not in some cases constitute a limitation on the unit itself.

The functions described above herein may be performed, at least in part, by one or more hardware logic components. For example, non-limitingly, exemplary types of hardware logic components that may be used include: field-programmable gate arrays (FPGAs), application-specific integrated circuits (ASICs), application-specific standard products (ASSPs), systems-on-chip (SOCs), complex programmable logic devices (CPLDs), and the like.

In the context of this disclosure, a machine-readable medium may be a tangible medium that may contain or store a program for use by or in conjunction with an instruction execution system, device, or apparatus. The machine-readable medium may be a machine-readable signal medium or a machine-readable storage medium. Machine readable media may include, but are not limited to, electronic, magnetic, optical, electromagnetic, infrared, or semiconductor systems, devices, or equipment, or any suitable combination of the foregoing. More specific examples of machine-readable storage media would include one or more wire-based electrical connections, portable computer disks, hard disks, random access memory (RAM), read-only memory (ROM), erasable programmable read-only memory (EPROM or flash memory), optical fiber, convenient compact disk read-only memory (CD-ROM), optical storage devices, magnetic storage devices, or any suitable combination of the above any suitable combination of the above.

According to one or more embodiments, the present disclosure provides an electronic document processing method, comprising: determining, in a current display interface, target content from document content of a first document in response to a document content determination operation; and creating, in response to a document creation operation in a current display interface, a second document associated with the first document, wherein the second document is associated with the first document based on the target content.

According to one or more embodiments, the present disclosure provides an electronic document processing method, the creating, in response to a document creation operation in a current display interface, a second document associated with the first document, comprises: displaying a document creation control in response to the document content determination operation, and creating the second document associated with the first document in response to an operation on the document creation control; or determining, in response to the document content determination operation, whether a document creation gesture or voice command is received, and creating the second document associated with the first document in response to receiving the document creation gesture or voice command.

According to one or more embodiments, the present disclosure provides an electronic document processing method, the determining, in a current display interface, target content from document content of a first document in response to a document content determination operation comprises: in response to a selection operation on some content in the first document, determining the target content based on the some content; or in response to an input operation on a preset symbol and content information, determining the target content based on the content information.

According to one or more embodiments, the present disclosure provides an electronic document processing method, the determining the target content based on the some content comprises: determining the target content to be the some content, content obtained by analyzing the some content, a combination of the some content and other content, a combination of other content and the content obtained by analyzing the some content, a paragraph(s) where the some content is located, a paragraph(s) identified by the some content, or content converted from the some content.

According to one or more embodiments, the present disclosure provides an electronic document processing method, the other content comprises relevant information of the first document.

According to one or more embodiments, the present disclosure provides an electronic document processing method, the some content comprises at least one content block, and each content block is a unit used for carrying the content of the first document.

According to one or more embodiments, the present disclosure provides an electronic document processing method, the displaying a document creation control in response to the document content determination operation comprises:
displaying the document creation control in response to a trigger operation on a first control associated with some content in the first document; or displaying a second control comprising the document creation control in response to a selection operation on some content in the first document.

According to one or more embodiments, the present disclosure provides an electronic document processing method, comprising: displaying a document identifier of the second document in the first document.

According to one or more embodiments, the present disclosure provides an electronic document processing method, comprising: displaying a sharing identifier at an associated position of the document identifier of the second document, and sharing the second document to a target sharing object in response to a sharing operation.

According to one or more embodiments, the present disclosure provides an electronic document processing method, the sharing the second document to a target sharing object in response to a sharing operation comprises:
displaying a sharing information edit control in response to a trigger operation on the sharing identifier, the sharing information edit control being used for determining sharing information; and sharing the second document to the target sharing object based on the determined sharing information.

According to one or more embodiments, the present disclosure provides an electronic document processing method, the creating a second document associated with the first document in response to a document creation operation comprises:
displaying a sharing information edit control in response to an operation of creating and sharing a document, the sharing information edit control being used for determining sharing information; and creating the second document associated with the first document in response to a sharing information confirmation operation, and sharing the second document to a target sharing object based on the determined sharing information.

According to one or more embodiments, the present disclosure provides an electronic document processing method, the determining sharing information comprises one or more of the following content: determining title information of the second document, determining the target sharing object of the second document, and determining a permission of the target sharing object.

According to one or more embodiments, the present disclosure provides an electronic document processing method, the determining title information of the second document comprises: determining a title of the second document according to content input in a title edit area in response to an input operation in the title edit area of the sharing information edit control;
or displaying, in the title edit area of the sharing information edit control, default title information determined based on the target content, and determining the default title information as the title of the second document in response to the sharing information confirmation operation.

According to one or more embodiments, the present disclosure provides an electronic document processing method, the determining a title of the second document according to content input in a title edit area in response to an input operation in the title edit area of the sharing information edit control comprises: displaying, in the title edit area, the default title information determined based on the target content, and determining the title of the second document in response to an amendment operation on the default title information.

According to one or more embodiments, the present disclosure provides an electronic document processing method, the default title information comprises corresponding title information of the target content in the first document, or the default title information comprises the target content, or the default title information comprises content obtained by analyzing the target content.

According to one or more embodiments, the present disclosure provides an electronic document processing method, the corresponding title information of the target content in the first document comprises: title information of the content block where the target content is located in the first document, or combined information of the title information of the content block where the target content is located and the title information of the first document.

According to one or more embodiments, the present disclosure provides an electronic document processing method, the method further comprises: adjusting a display style of the target content in the first document to a target display style after generating the second document.

According to one or more embodiments, the present disclosure provides an electronic document processing method, the adjusting to the target display style comprises one or more of the following content: adding a box or icon for an area where the target content is located, or changing a text style or layout style of the target content.

According to one or more embodiments, the present disclosure provides an electronic document processing method, further comprising: changing a display style of the document identifier of the second document to a second style in response to a delete event about the second document, the second style being different from a first style of the document identifier of the second document in the first document before the second document is deleted.

According to one or more embodiments, the present disclosure provides an electronic document processing method, the association between the second document and the first document based on the target content comprises: both the first document and the second document display the target content, or the second document references the target content.

According to one or more embodiments, the present disclosure provides an electronic document processing method, comprising: determining, in response to receiving a first document, permission information of a current user about a second document embedded in the first document; and displaying relevant information of the second document and a permission application identifier in a preset style if the current user has no preset permission for the second document.

According to one or more embodiments, the present disclosure provides an electronic document processing method, the permission application identifier comprises owner information of the second document and/or a permission application entry, the permission application entry being used for outputting a permission application interface after being triggered.

According to one or more embodiments, the present disclosure provides an electronic document processing method, comprising: selecting, in a current display interface, target document content from document content of a first document in response to a selection operation, the target document content being some document content of the first document; and determining a target sharing object in response to a sharing operation and sharing the target document content to the target sharing object.

According to one or more embodiments, the present disclosure provides an electronic document processing method, the determining a target sharing object in response to a sharing operation and sharing the target document content to the target sharing object comprises: creating a second document in response to the sharing operation, and sharing the second document to the target sharing object, wherein document content of the second document comprises the target document content.

According to one or more embodiments, the present disclosure provides an electronic document processing method, the determining a target sharing object in response to a sharing operation and sharing the target document content to the target sharing object comprises: obtaining a first link to the first document in response to the sharing operation, generating a second link according to the first link and a scope of the target document content in the first document, and sharing the second link to the target sharing object, the second link being used for indicating that a receiving end of the second link displays the target document content and hides some other content or all other content in the first document except the target document content.

According to one or more embodiments, the present disclosure provides an electronic document processing apparatus, comprising: a determination unit, configured to determine, in a current display interface, target content from document content of a first document in response to a document content determination operation; and a creation unit, configured to create, in response to a document creation operation in the current display interface, a second document associated with the first document, wherein
the second document is associated with the first document based on the target content.

According to one or more embodiments, the present disclosure provides an electronic document processing apparatus, comprising: a determination module, configured to determine, in response to receiving a first document, permission information of a current user about a second document embedded in the first document; and a display module, configured to display relevant information of the second document and a permission application identifier in a preset style if the current user has no preset permission for the second document.

According to one or more embodiments, the present disclosure provides an electronic document processing apparatus, comprising: a selection module, configured to select, in a current display interface, target document content from document content of a first document in response to a selection operation, the target document content being some document content of the first document; and a sharing module, configured to determine a target sharing object in response to a sharing operation and share the target document content to the target sharing object.

According to one or more embodiments, the present disclosure provides a terminal, comprising: at least one memory and at least one processor, wherein the at least one memory is configured to store program code, and the at least one processor is configured to call the program code stored in the at least one memory to perform the method according to any one of above.

According to one or more embodiments, the present disclosure provides a storage medium, the storage medium storing program code, and the program code being used for performing the method according to any one of above.

The above description is only a better embodiment of the present disclosure and a description of the technical principles applied. It should be understood by those skilled in the art that the scope of the disclosure covered by the present disclosure is not limited to technical solutions formed by specific combinations of the above technical features, but should also cover other technical solutions formed by any combination of the above technical features or their equivalent features without departing from the above disclosed idea. For example, the above features are interchangeable with (but not limited to) technical features with similar functions disclosed in the present disclosure.

Further, while the operations are depicted in a particular order, this should not be construed as requiring that the operations be performed in the particular order shown or in sequential order. Multitasking and parallel processing may be advantageous in certain environments. Again, while several specific implementation details are included in the above discussion, these should not be construed as limiting the scope of the present disclosure. Certain features described in the context of separate embodiments may also be implemented in combination in a single embodiment. Conversely, the various features described in the context of a single embodiment may also be implemented in multiple embodiments individually or in any suitable sub-combination.

Although the present subject matter has been described using language specific to structural features and/or method logical actions, it should be understood that the subject matter as defined in the appended claims is not necessarily limited to the particular features or actions described above. Rather, the particular features and actions described above are merely exemplary forms of claim fulfillment.

What is claimed is:

1. A method for fast creation of a second document associated with a first document, comprising:
   determining, in a current display interface, target content from document content of the first document in response to a document content determination operation, wherein the current display interface is a display interface of the first document;
   creating, in response to a document creation operation in the current display interface, the second document associated with the first document without performing copy and paste operations on the target content, wherein the second document is associated with the first document based on the target content;
   building an association relationship between the second document and the first document while creating the second document; and
   displaying an identifier of the second document in the display interface of the first document after a creation of the second document is completed, wherein the identifier of the second document is configured to perform an operation of sharing the second document via the display interface of the first document.

2. The method according to claim 1, wherein the creating, in response to a document creation operation in the current display interface, the second document associated with the first document, comprises:
   displaying a document creation control in response to the document content determination operation, and creating the second document associated with the first document in response to an operation on the document creation control; or
   determining, in response to the document content determination operation, whether a document creation gesture or voice command is received, and creating the second document associated with the first document in response to receiving the document creation gesture or voice command.

3. The method according to claim 1, wherein the determining, in a current display interface, target content from document content of the first document in response to a document content determination operation comprises:
   in response to a selection operation on some content in the first document, determining the target content based on the some content;
   or,
   in response to an input operation on a preset symbol and content information, determining the target content based on the content information.

4. The method according to claim 3, wherein the determining the target content based on the some content comprises:
   determining the target content to be the some content, content obtained by analyzing the some content, a combination of the some content and other content, a combination of other content and the content obtained by analyzing the some content, a paragraph(s) where the some content is located, a paragraph(s) identified by the some content, or content converted from the some content.

5. The method according to claim 4, wherein the other content comprises relevant information of the first document.

6. The method according to claim 3, wherein
   the some content comprises at least one content block, and each content block is a unit used for carrying the content of the first document.

7. The method according to claim 2, wherein the displaying a document creation control in response to the document content determination operation comprises:
   displaying the document creation control in response to a trigger operation on a first control associated with some content in the first document; or
   displaying a second control comprising the document creation control in response to a selection operation on some content in the first document.

8. The method according to claim 1, comprising:
   displaying a sharing identifier at an associated position of the document identifier of the second document, and sharing the second document to a target sharing object in response to a sharing operation.

9. The method according to claim 8, wherein the sharing the second document to a target sharing object in response to a sharing operation comprises:
   displaying a sharing information edit control in response to a trigger operation on the sharing identifier, the sharing information edit control being used for determining sharing information; and sharing the second document to the target sharing object based on the determined sharing information.

10. The method according to claim 1, wherein the method further comprises:
    adjusting a display style of the target content in the first document to a target display style after generating the second document.

11. The method according to claim 10, wherein the adjusting to the target display style comprises one or more of the following content:
    adding a box or icon for an area where the target content is located, or changing a text style or layout style of the target content.

12. The method according to claim 1, further comprising:
    changing a display style of the document identifier of the second document to a second style in response to a delete event about the second document, the second style being different from a first style of the document identifier of the second document in the first document before the second document is deleted.

13. The method according to claim 1, wherein the association between the second document and the first document based on the target content comprises: both the first document and the second document display the target content, or the second document references the target content.

14. A terminal for fast creation of a second document associated with a first document, comprising,
    at least one memory and at least one processor, wherein the at least one memory is configured to store program code, and the at least one processor is configured to call the program code stored in the at least one memory to perform operations comprising:
    determining, in a current display interface, target content from document content of the first document in response to a document content determination operation, wherein the current display interface is a display interface of the first document;
    creating, in the current display interface, the second document associated with the first document without performing copy and paste operations on the target content in response to a document creation operation, wherein the second document is associated with the first document based on the target content;

building an association relationship between the second document and the first document while creating the second document; and displaying an identifier of the second document in the display interface of the first document after a creation of the second document is completed, wherein the identifier of the second document is configured to perform an operation of sharing the second document via the display interface of the first document.

* * * * *